April 29, 1930. S. PERRY 1,756,660
THERMOSTATIC DEVICE
Filed May 25, 1928
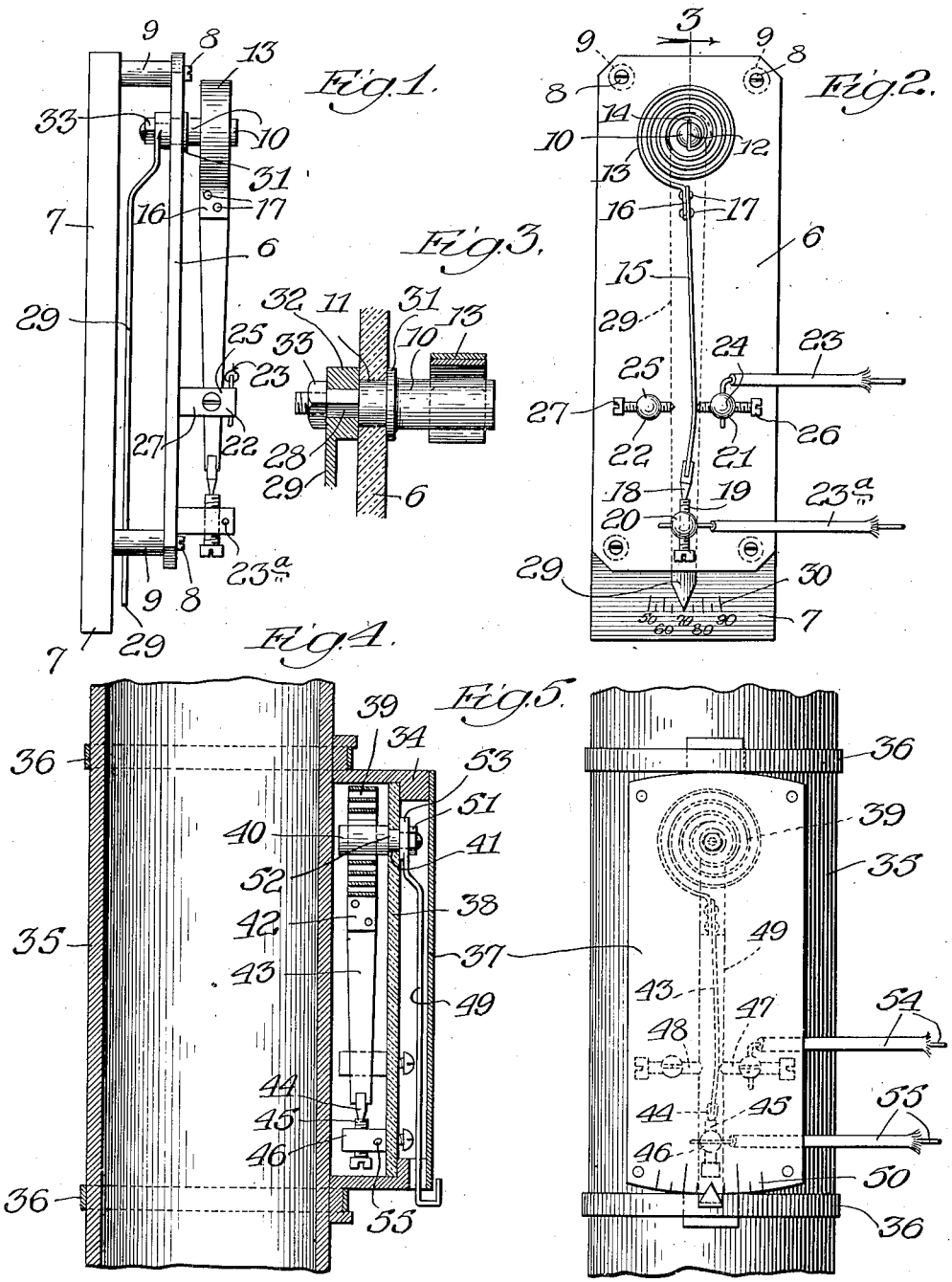
Inventor:
Stanley Perry,
By Dyrenforth, Lee, Chritton & Wiles,
Attys.

Patented Apr. 29, 1930

1,756,660

UNITED STATES PATENT OFFICE

STANLEY PERRY, OF CHICAGO, ILLINOIS, ASSIGNOR TO AUTOMATIC BURNER CORPORATION, OF CHICAGO, ILLINOIS, A CORPORATION OF ILLINOIS

THERMOSTATIC DEVICE

Application filed May 25, 1928. Serial No. 280,497.

My invention relates, more particularly, to electrical thermostatic devices provided for the controlling of electrical circuits responsive to changes in temperature to which the devices are subjected.

One of my objects is to provide a thermostatic switch device requiring in its use for controlling a circuit, connection with two wires only.

Another object is to provide a novel, simple and economical construction of thermostatic switch device.

Another object is to provide a thermostatic switch device which will operate responsive to relatively slight temperature changes and be positive in operation.

Another object is to provide a thermostatic switch device in which the movable contact member is maintained positively in circuit open or circuit closed condition, as the case may be and under sufficient tension to prevent displacement thereof in the event of vibration of the switch device.

Another object is to provide a thermostatic switch device whereby the contacts are made and broken by a snap action preventing sparking at the contacts and the burning thereof.

Another object is to provide a thermostatic switch device having means for readily varying the temperature differential between the on and off positions of the switch; and other objects as will be manifeest from the following description.

Referring to the accompanying drawing:—

Figure 1 is a view in side elevation of a thermostatic switch device constructed in accordance with my invention and shown as provided as a room thermostat for controlling the operation of heat producing means, as for example an oil-burner-equipped boiler for heating the room equipped with the device.

Figure 2 is a view in front elevation of the device shown in Fig. 1.

Figure 3 is an enlarged broken sectional view taken at the line 3 of Fig. 2 and viewed in the direction of the arrow.

Figure 4 is a view in sectional elevation of a hot water boiler pipe shown as equipped with a boiler thermostatic switch device, also shown in sectional elevation, constructed in accordance with my invention; and Figure 5, a face view of the structure shown in Fig. 4.

Referring to the device shown in Figs. 1, 2 and 3, it comprises a plate 6 of insulating material shown as supported on a base plate 7 in parallel, spaced, relation thereto, through the medium of screws 8 passing through the plate 6, spacer sleeves 9 and into the base plate 7. The plate 6 is provided with a stud 10 positioned in an opening 11 therein and containing a slot 12 in its outer end.

The device also comprises a relatively stiff thermostatic coil 13 the inner end of which is deflected as represented at 14 and extends into the slot 12 to form a rigid connection of the coil 13 at one end with the stud 10, the coil 13 surrounding this stud as shown.

The coil 13 is formed of two strips of metal, as represented more particularly in Fig. 3 flatwise opposed throughout the extent of the coil and having different coefficients of expansion, whereby the condition of the coil 13 changes responsive to changes in the temperature of the surrounding air; in the particular arrangement shown the coil 13 being so constructed that, as the temperature surrounding it lowers, it moves to more tightly coiled condition and as the temperature surrounding it rises, moves to less coiled condition.

The device also comprises a relatively flexible strip 15 of spring metal, one end of which is connected with a deflected portion 16 of the coil 13, as represented at 17, and the other end of which bears, at a pointed head 18 thereon, against an adjustable stop or abutment member 19 screwed into a stationary binding post 20 carried by the plate 6. The screw 19 which is longitudinally aligned with the pointed extremity 18 of the strip 15, and is therefore adjustable generally in the direction of this strip, is preferably recessed at its inner end to receive the pointed extremity of the part 18 to maintain the strip 15 against accidental disengagement from the stop 19 and to minimize friction between these parts in the flexing of the strip as hereinafter described.

The member 15, according to the preferred illustrated embodiment of my invention, is positioned between two abutment devices 21 and 22 mounted on the plate 6. Either or both of these abutments may be electrical contacts. In the arrangement shown the abutment 21 only is shown as used as a contact for connection with one of the wires leading to the device to be controlled, this wire being shown at 23 and the other one thereof, represented at 23$^a$, being connected with the binding-post 20.

The abutments 21 and 22 are shown as in the form of binding-posts comprising studs 24 and 25, respectively, secured to the plate 6 and screws 26 and 27 adjustable therein with their inner ends opposed in alinement at opposite sides of the member 15.

The coil 13 which is relatively stiff as compared with the strip 15, exerts a compression action on the end of the strip 15 engaged thereby which causes the latter to bear normally, in deflected or sprung condition, against one or the other of the abutments 21 or 22 due to the resistance of the abutment 19, this compression action operating to spring the strip 15 in opposite directions responsive to the coiling and uncoiling of the coil, the strip 15 being preferably of reduced width adjacent the abutments 21 and 22, as for example by tapering its opposite edges as shown, to localize the bulging of the strip at these abutments.

As the coil 13 is resilient the force exerted by it endwise against the strip 15 is a yielding force whereby the strip 15 flexes from one position to the other, and thus into and out of engagement with the abutments 21 and 22, without subjecting the parts to undue stress or restrictions in these movements and, by a quick, snap action producing a quick make and break which avoids sparking at the contacts and burning thereof.

By adjusting the screws 26 and 27 of the abutments 21 and 22, the device may be caused to present a high degree of sensitivity, it having been found in practice that a desirable degree thereof may be effected by providing a clearance of approximately 6/1000 of an inch between the strip 15 and the one of the abutments 21 and 22 out of engagement therewith.

The device as shown provides for the setting thereof to operate responsive to any desired temperature produced at the thermostat. These means involve the rotatable mounting of the stud 10 in the plate 6, with sufficient friction at the stud 10 to maintain it in any position to which it is angularly adjusted about its axis. The rear end of the stud 10 is shown as square in cross section as represented at 28 at which it is provided with a depending pointer 29 located between the plates 6 and 7 and depending below the plate 6 where it cooperates with a temperature scale represented at 30 this scale being calibrated to the angular adjustment of the stud 10. In the arrangement shown the desired friction between the stud 10 and the plate 6 is effected by a slight clamping action between a flange 31 on the stud 10 and the head 32 of the pointer 29 held in place on the shaft by a nut 33 screwing on the threaded inner end of this shaft.

It will be understood from the foregoing that by adjusting the stud 10 in clockwise direction in Fig. 2 the disengagement of the strip 15 from the contact 21 will be effected at a lower temperature than when in the position from which it was adjusted and that by adjusting the stud in the opposite direction the contact will be broken at a higher temperature.

The thermostatic switch device of Figs. 4 and 5 is of the same general construction and operates in the same manner, as the device of Figs. 1, 2 and 3, this form of device being provided for use more particularly in conjunction with the hot water pipe of a hot water boiler, as for example to control the operation of a burner supplying heat to the boiler.

In this arrangement a housing 34, preferably of heat-insulating material and open at its rear portion, is clamped conformingly against a side of a hot water pipe such as that represented at 35, as by clamp bands 36, the outer side of the housing being formed of a plate 37 and the interior of the housing containing a plate 38 of electrical insulating material spaced from the plate 37.

The device also comprises a coil 39 like the coil 13 rigidly secured at its inner end to a stud 40 rotatably adjustable in an opening 41 in the plate 38, the lower, movable, end portion 42 of the coil 39 being rigidly secured to the upper end of a flexible strip 43, like the strip 15, which in sprung condition engages at its lower pointed end 44 with an adjustable abutment 45, like the abutment 19, secured in a lug 46 on the rear side of the plate 38, the arrangement of the parts being such that the strip 43 is in normally deflected condition against one or the other of the abutment devices 47 and 48, like the abutments 21 and 22, and on the plate 38 at opposite sides of the member 43.

The device now being described also is adapted for adjustment to cause it to operate responsive to any desired temperature produced at the thermostat, the means for this purpose comprising the rotatable mounting of the stud 40 on the plate 38, with sufficient friction at the stud 40 to maintain it in any position to which it is angularly adjusted about its axis, this stud being provided with a pointer cooperating with a scale 50 on the plate 37 and mounted at its upper end on the forward end of the stud 40 by means of a nut 51 screwing upon the stud. The desired amount of friction between the stud 40 and the plate 38 is produced in the structure shown by a slight clamping action exerted against the plate 38 by a shoulder 52 on the inner end of the stud and the head 53 of the pointer.

In this particular arrangement the thermostat is provided to control a circuit in which it is interposed, when the heat of the water in the pipe 35 rises to the predetermined degree at which the thermostatic device is to be operated, and thus the abutment device 47 is the one which is used for connection with one of the circuit wires, this wire being represented at 54 and the other of said wires, represented at 55, being connected with the binding post 46.

While I have illustrated and described certain forms in which my invention may be embodied, I do not wish to be understood as intending to limit it thereto, as the same may be variously modified and altered and the invention embodied in other forms, without departing from the spirit thereof.

What I claim as new, and desire to secure by Letters Patent, is:

1. In a thermostatic switch device, the combination of a thermostatic coil anchored at one end, an abutment, and a flexible member operatively engaged at one end with the other, movable, end of said coil and having endwise abutting engagement at its other end with said abutment, said flexible member between its ends being in sprung condition.

2. In a thermostatic switch device, the combination of a thermostatic coil anchored at one end, an abutment, a flexible member operatively engaged at one end with the other, movable, end of said coil and having endwise abutting engagement at its other end with said abutment, said flexible member between its ends being in sprung condition, and a stationary contact into and out of engagement with which said flexible member at a portion between its ends flexes responsive to the coiling and uncoiling of said coil.

3. In a thermostatic switch device the combination of a thermostatic coil anchored at its inner end, an abutment, and a flexible member operatively engaged at one end, with the other, movable, end of said coil, and having endwise abutting engagement at its other end with said abutment, said flexible member between its ends being in sprung condition.

4. In a thermostatic switch device the combination of a thermostatic coil anchored at its inner end, an abutment, a flexible member operatively engaged at one end, with the other, movable, end of said coil, and having endwise abutting engagement at its other end with said abutment, said flexible member between its ends being in sprung condition and a stationary contact into and out of engagement with which said flexible member at a portion between its ends flexes responsive to the coiling and uncoiling of said coil.

5. In a thermostatic switch device, the combination of a thermostatic coil anchored at one end, an abutment, a flexible member operatively engaged at one end with the other, movable, end of said coil and having endwise abutting engagement at its other end with said abutment, said flexible member between its ends being in sprung condition and spaced apart relatively stationary members located at opposite sides of said flexible member and into alternate engagement with which the latter at a portion between its ends is flexed by the coiling and uncoiling of said coil.

6. In a thermosatic switch device, the combination of a thermostatic coil, means for holding the inner end of said coil stationary, said means being adjustable to adjust said coil angularly about its axis, an abutment, a stationary contact, and a flexible member operatively engaged at one end with the outer end of said coil and having endwise abutting engagement at its other end with said abutment, said flexible member between its ends being in sprung condition.

7. In a thermostatic switch device, the combination of a thermostatic coil anchored at one end, an abutment, and a flexible member operatively engaged at one end with the other, movable, end of said coil and having endwise abutting engagement at its other end with said abutment, said flexible member between its ends being in sprung condition, said abutment being adjustable toward and away from said coil, for the purpose set forth.

8. In a thermostatic switch device, the combination of a thermostatic coil anchored at one end, an abutment, and a flexible member operatively engaged at one end with the other, movable, end of said coil and having endwise abutting engagement at its other end with said abutment, said flexible member between its ends being in sprung condition, said abutment being in the form of a screw supported for adjustment toward and away from said coil, for the purpose set forth.

9. In a thermostatic switch device, the combination of a thermostatic coil anchored at one end, an abutment, a flexible member operatively engaged at one end with the other, movable, end of said coil and having endwise abutting engagement at its other end with said abutment, said flexible member between its ends being in sprung condition, and a stationary contact, into and out of engagement with which said flexible member at a portion between its ends flexes responsive to the coiling and uncoiling of said coil, said contact being adjustable toward and away from said member.

10. In a thermostatic switch device, the combination of a thermostatic coil anchored at one end, an abutment, a flexible member operatively engaged at one end with the other, movable, end of said coil and having endwise abutting engagement at its other end with said abutment, said flexible member between its ends being in sprung condition and spaced apart relatively stationary members located at opposite sides of said flexible member and into alternate engagement with which the latter at a portion between its ends is flexed by the coiling and uncoiling of said coil, said second-named members being independently adjustable toward and away from said flexible member.

11. In a thermostatic switch device, the combination of a thermostatic coil anchored at one end, an abutment, a flexible member operatively engaged at one end with the other, movable, end of said coil and having endwise abutting engagement at its other end with said abutment, said flexible member between its ends being in sprung condition, said abutment being adjustable toward and away from said coil, and a stationary contact into and out of engagement with which said flexible member at a portion between its ends flexes responsive to the coiling and uncoiling of said coil, said contact being adjustable toward and away from said member.

12. In a thermostatic switch device, the combination of a thermostatic coil anchored at one end, an abutment, a flexible member operatively engaged at one end with the other, movable, end of said coil and having endwise abutting engagement at its other end with said abutment, said flexible member between its ends being in sprung condition, said abutment being adjustable toward and away from said coil, and spaced apart relatively stationary members located at opposite sides of said flexible member and into alternate engagement with which the latter at a portion between its ends is flexed by the coiling and uncoiling of said coil, said second-named members being independently adjustable toward and away from said flexible member.

13. In a thermostatic switch device, the combination of a thermostatic coil anchored at one end, an abutment, and a flexible member presenting greater flexibility than said coil operatively engaged at one end with the other, movable, end of said coil and having endwise abutting engagement at its other end with said abutments, said flexible member between its ends being in sprung condition.

14. In a thermostatic switch device, the combination of a thermostatic coil anchored at one end, an abutment, and a flexible member of less thickness than the metal of which said coil is formed operatively engaged at one end with the other, movable, end of said coil and having endwise abutting engagement at its other end with said abutment, said flexible member, between its ends being in sprung condition.

STANLEY PERRY.